Dec. 11, 1923.
L. P. MEISTER
1,477,227
AUTOMATIC DRIP FAUCET
Filed July 14, 1922
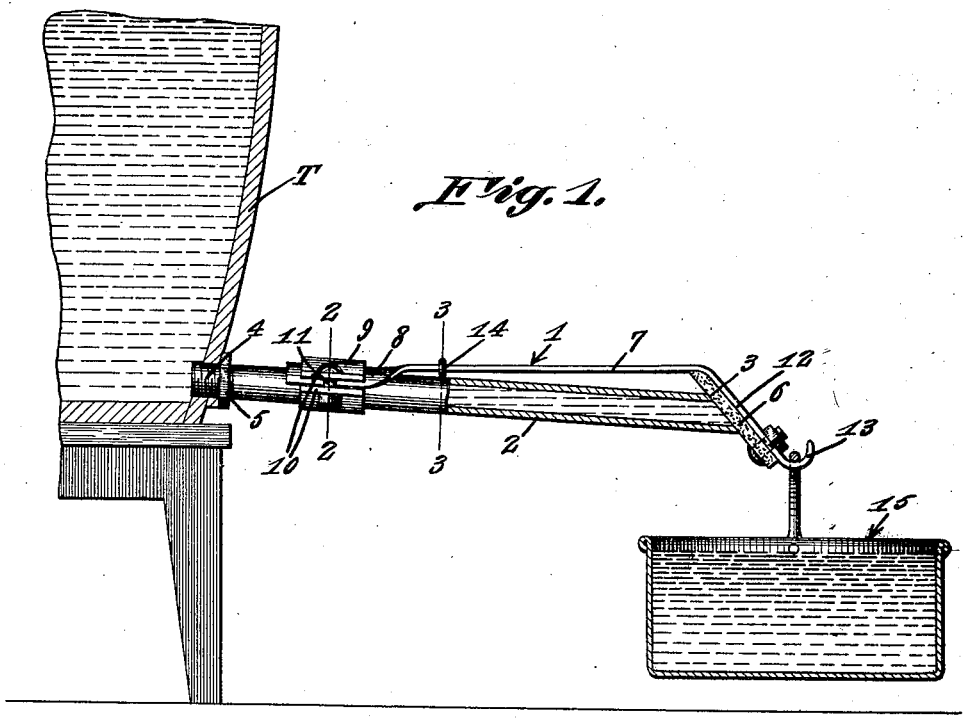
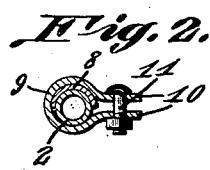
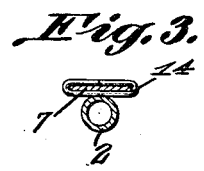
L. P. Meister, Inventor Patented Dec. 11, 1923.

1,477,227

UNITED STATES PATENT OFFICE.

LOUIS P. MEISTER, OF TROY, MISSOURI.

AUTOMATIC DRIP FAUCET.

Application filed July 14, 1922. Serial No. 575,010.

*To all whom it may concern:*

Be it known that I, LOUIS P. MEISTER, a citizen of the United States, residing at Troy, in the county of Lincoln and State of Missouri, have invented a new and useful Automatic Drip Faucet, of which the following is a specification.

This invention relates to watering troughs for poultry and the like.

The object of the invention is to provide watering means, the supply for which is regulated by the consumption.

Another object is to provide an automatic drip faucet for supplying water to a bucket or trough, the weight of said bucket or trough controlling the flow of water thereto.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation partly in section of the device constituting this invention shown applied.

Fig. 2 is a transverse section taken on the line 2—2 of Fig. 1 and

Fig. 3 is a similar view taken on the line 3—3 of Fig. 1.

In the embodiment illustrated, the faucet 1 constituting this invention is shown inserted in the lower end of a water supply tank T and it comprises a pipe 2 having its front end beveled as shown at 3 and its rear end threaded as shown at 4 for engagement with the tank T, said threaded portion having a collar 5 at its inner end adapted to abut the tank to form a water tight connection.

The pipe 2 which is designed to extend laterally from tank T is equipped with a closure 6 carried by a spring arm 7, the body portion of which extends substantially parallel with the pipe 2 and has its rear end 8 widened and curved transversely to snugly fit the pipe, and which is secured thereto by a clamp 9. This clamp 9 may be of any suitable or desired construction, being here shown substantially cylindrical with laterally extending lips 10 connected by a bolt 11.

The spring arm 7 has its front end 12 arranged at an obtuse angle to the body portion thereof and provided at its terminal with an upturned hook 13 which is designed to support a water container in the form of a bucket 15. The inclined or angular portion 12 of the spring arm 7 is secured to the pipe closure 6 by bolting or otherwise.

Water to be supplied through pipe 2 to the container 15 is designed to pass between the closure 6 and the end of said pipe, and said closure is held spaced from the pipe end a sufficient distance to permit the water to drip from said end into the container. The distance the closure is held away from the pipe end is controlled by a sliding link 14 carried by the arm 7 and which when forced inwardly, moves the arm 7 outward thereby moving the closure 6 away from the pipe end to permit more water to flow out therethrough. The flow of water through the pipe end is also controlled by the weight of the container 15 so that as the water in said container is consumed, the spring arm will lift the container and permit more water to pass out of the pipe end and drip into the container until sufficient has been supplied to cause the weight of the container with the water therein again to close the pipe.

From the above description it will be obvious that the poultry or animals may be supplied with fresh water continuously, the amount consumed by them regulating the amount fed to the container.

While a tank T is shown as the water supply, obviously pipe 2 may be connected with the water main and will operate in the same manner.

It will be obvious that when it is desired to cleanse the container 15, all that is necessary will be to remove it from the hook 13, wash it out and rehang it.

It will of course be understood that any form of container may be suspended from the hook 13 and its weight with the water held therein used to control the supply of water thereto.

This device obviously, is very cheap to manufacture and consequently will be within the reach of practically everybody desiring automatically controlled watering devices for poultry, stock and the like.

I claim:—

1. A device of the class described comprising a pipe having means at one end for connection with a water supply and its other end beveled, a spring arm having one end end widened and curved transversely to fit snugly against said pipe, a clamp for securing said end to said pipe, the other end of said arm being bent at an obtuse angle and having a closure for the beveled end of the pipe, the terminal of said bent end being in the form of a hook and a bail supported water receptacle adapted to be mounted on said hook, the weight of water in said receptacle regulating the flow of water through said pipe.

2. A device of the class described comprising a pipe having means at one end for connection with a water supply and its other end beveled, a spring arm secured at one end to said pipe and having its other end bent at an obtuse angle, said bent end carrying a closure for the beveled end of the pipe, and having means to detachably support a water receptacle.

In testimony that I claim the foregoing as my own, I have hereto affixed my signature in the presence of two witnesses.

LOUIS P. MEISTER.

Witnesses:
WILLIAM C. MARTIN,
B. J. CUSH.